W. L. HOWARD.
VEHICLE WHEEL.
APPLICATION FILED JAN. 7, 1909.

932,862.

Patented Aug. 31, 1909.
2 SHEETS—SHEET 1.

WITNESSES
Geo. W. Naylor
C. W. Fairbank

INVENTOR
William L. Howard
BY
Munn & Co.
ATTORNEYS

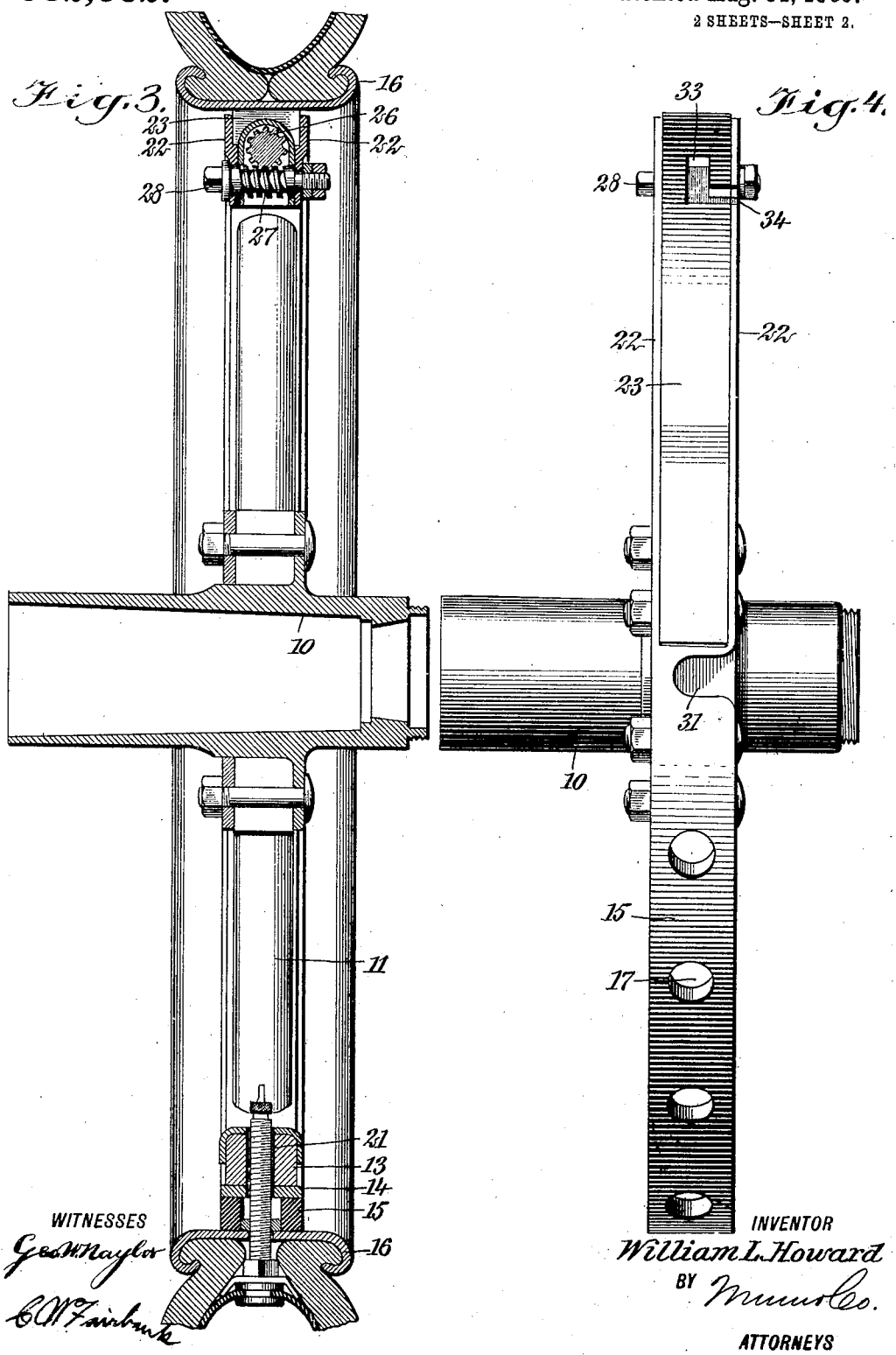

UNITED STATES PATENT OFFICE.

WILLIAM L. HOWARD, OF TRENTON, NEW JERSEY.

VEHICLE-WHEEL.

932,862.   Specification of Letters Patent.   Patented Aug. 31, 1909.

Application filed January 7, 1909.  Serial No. 471,037.

*To all whom it may concern:*

Be it known that I, WILLIAM L. HOWARD, a citizen of the United States, and a resident of Trenton, in the county of Mercer and State of New Jersey, have invented a new and Improved Vehicle-Wheel, of which the following is a full, clear, and exact description.

This invention relates to certain improvements in wheels having removable rims, and more particularly to the mechanism for rigidly locked the rim in place yet permitting of its ready removal.

My invention is particularly adapted for vehicle wheels having pneumatic tires carried by the rims, the object being to facilitate the removal of the rim and the tire and the substitution of a new rim and tire in case of puncture or other injury to the tire.

My invention consists in the forming of the felly of a plurality of sections movable in respect to each other, so as to grip the rim and at the same time to lock it against either axial or circumferential movement.

Reference is to be had to the accompanying drawings, forming a part of this specification, in which similar characters of reference indicate corresponding parts in all the figures, and in which—

Figure 1:
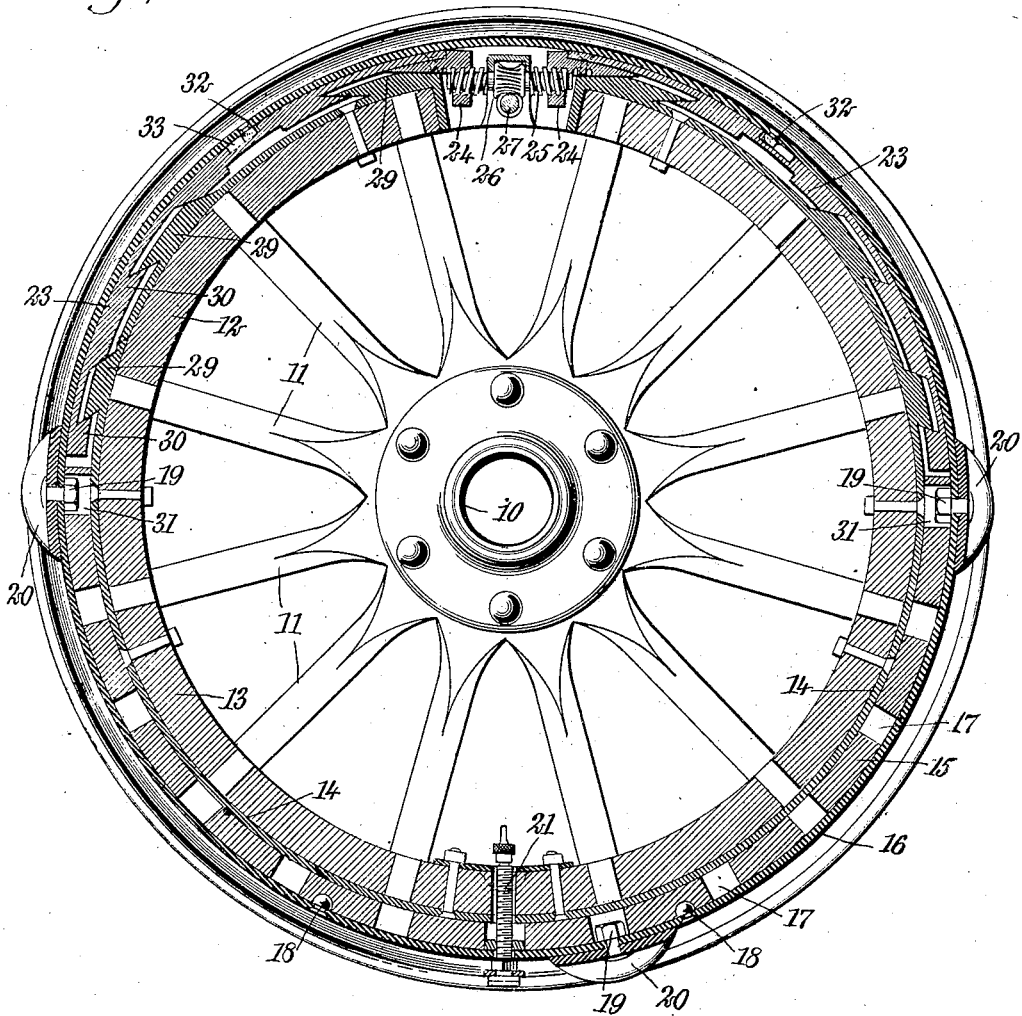
Figure 2:
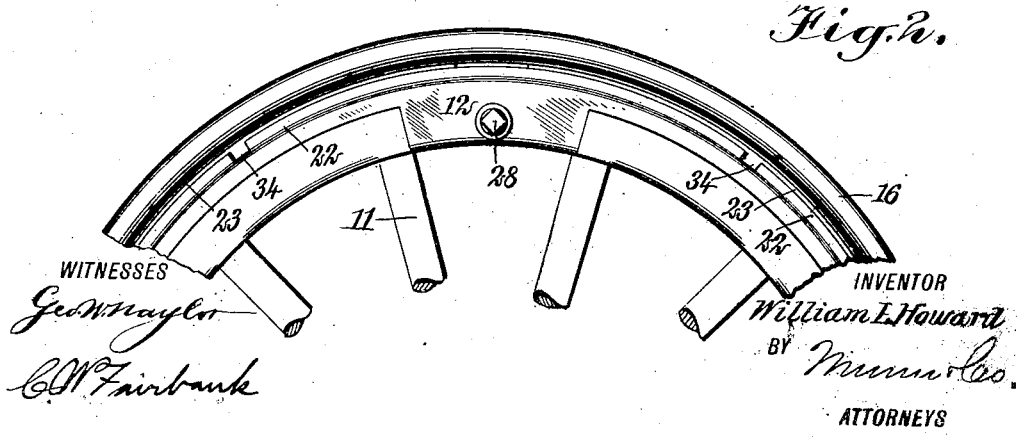

Figure 1 is a section through a wheel constructed in accordance with my invention, the section being taken in the plane of the wheel; Fig. 2 is a side elevation of a portion of the wheel; Fig. 3 is a section taken at right angles to the plane of Fig. 1; and Fig. 4 is an edge view of the wheel, the rim being removed.

In my improved wheel I may employ any suitable form of hub 10 and any suitable form of spokes 11 for the felly 12. In the specific form of felly illustrated, I employ an inner annular member 13 secured to the outer ends of the spokes and having rigidly secured to the periphery thereof a metal band 14, constituting a second annular member. Encircling the band 14 and rigidly secured thereto I provide a third annular member 15, the peripheral surface along approximately one-half the circumference of which engages directly with the inner surface of the removable rim 16. The rim 16 differs in no essential particular from the ordinary clencher rims commonly used, and the radius of curvature of the inner surface of the rim is substantially the same as the radius of curvature of approximately one-half of the annular member 15. This portion of the annular member 15, illustrated as the lower half in Figs. 1, 3 and 4 of the drawings, may be made up of separate sections or may be provided with openings 17, to reduce the weight of the wheel, and may be provided with other openings to receive studs or projections 18 on the rim, a locking bolt 19 for a tire-holding member 20, and a valve stem 21 for the tire. The projections 18 closely fit their apertures and serve to prevent any circumferential movement of the rim in respect to the felly, and also to prevent any direct axial movement of one in respect to the other. The locking bolts 19 of the tire-holding members 20 may also serve the same purpose or may be relied upon exclusively to secure the desired object.

The opposite half of the annular member 15, that is, the upper half shown in the drawings, is provided with two substantially parallel annular side flanges 22, 22, having their outer peripheral edges in the arc of a slightly smaller circle than the inner periphery of the rim, so that they do not quite contact therewith. The portion intermediate of these two side flanges is cut away, so as to leave annular channels within which are disposed two movable gripping members 23, 23. Each of these two members is in the form of a band section and each is of a width substantially equal to the distance between the two flanges 22, 22. The outer surfaces of the two gripping members 23, 23 are adapted for frictional engagement with the inner surface of the rim, and the members are so constructed that they may be moved radially to effect this engagement with the rim and the resultant gripping action. For moving the members 23, 23 radially, I provide means for moving them circumferentially over cam surfaces, which forces them outwardly. Each member 23 at its end adjacent the other member, is rigidly secured to a nut section 24, and disposed between the ends of the two members and engaging with the two nut sections is a spreading member 25. This spreading member has one end provided with a right-hand thread for engagement with one nut section 24 and the opposite end provided with a left-hand thread for engagement with the other nut section 24, and intermediate of the ends of the spreading member is a worm wheel 26 in engagement with a worm 27 carried by a short rotatable member 28 extending through the felly substantially parallel to the axis of the wheel and held against longitudinal movement. One end of the worm-carrying member 28 is provided with a square head whereby a wrench or other tool may be applied thereto for rotating the worm in either direction and moving the two gripping members 23, 23 toward or away from each other. The circumferential movement of the gripping members is converted into a radial movement by the action of cams carried by the annular member 14 upon its outer surface, and coacting cams carried by the gripping members 23 upon their inner surface. As shown, the annular member 14 is provided with outwardly-extending blocks 29, arranged alternately with inwardly-extending blocks 30 carried by the gripping members 23. The coacting surfaces of these blocks are arranged at such an angle that when the members 23 are forced apart, each block 30 will engage with one block 29 to force the members 23 outward radially, and when the members 23 are drawn toward each other, the blocks 30 will engage with the undercut opposite surfaces of the blocks 29 and be drawn inwardly. In order that both ends of each member 23 may be forced outward radially to the same extent, it is necessary that the cam surfaces of the blocks 29 nearest to the spreading member 23 be nearly tangential and that the cam surfaces of the blocks farthest from the spreading member be more nearly radially disposed.

In securing a rim to the felly, the gripping members 23 are drawn toward each other to the limiting extent and the rim is then set at an angle to the plane of the felly and the valve stem 21 and the projections 18 brought approximately into place. The upper edge of the rim may then be moved to bring it into the plane of the felly, and by applying a wrench or other tool to the worm-carrying member 28 and rotating the latter, the members 23 may be spread apart, and at the same time moved outward radially to grip the inner surface of the rim and positively prevent its displacement. As the felly at a point midway between the spreading member and the valve stem, is of approximately the same diameter as the inner surface of the rim, it is necessary that the locking bolts 19 of the tire-holding members 20 shall have slots or grooves 31 provided therefor and extending to one edge of the member 15, as indicated particularly in Fig. 4. For locking the portion of the rim adjacent the gripping members 23 against longitudinal movement in case of the accidental loosening of the gripping members, I preferably provide the rim with inwardly-extending studs or projections 32, normally held within bayonet slots 33 in the outer surface of the members 23. The flanges 22 are provided with openings or recesses 34, through which these studs or projections may move while the rim is being placed in position, and the circumferential movement of the locking members in the bayonet slots will positively prevent the studs from passing outwardly through these openings, unless the locking members be moved toward each other to the limiting extent.

In the specific form illustrated in the drawings, one-half of the wheel is formed of three separate annular members 13, 14 and 15, all rigidly secured together and having concentric surfaces. Inasmuch as these members are never moved in respect to each other during the operation of removing or replacing a rim, it is evident that it is only essential that one member present a surface for engagement with a portion of the inner surface of the rim, and that gripping members be moved circumferentially and radially to engage with other portions of the inner surface of the rim.

Having thus described my invention, I claim as new and desire to secure by Letters Patent:

1. A wheel having a felly and a removable rim, a member carried by said felly for engaging with a portion of the inner surface of the rim, and two gripping members movable circumferentially in opposite directions and radially into engagement with another portion of the inner surface of the rim, said gripping members presenting inner cam surfaces for effecting the radial movement during the circumferential movement.

2. A wheel having a felly and a rim, a member carried by the felly and presenting a series of cam surfaces, two gripping members adjacent said cam surfaces and engaging therewith, and a spreading member intermediate of said gripping members for spreading them apart circumferentially and causing their radial movement by their engagement with said cams.

3. A wheel having a felly and a removable rim, two outwardly-extending flanges carried by said felly, a series of cam surfaces intermediate of said flanges, and a member intermediate of said flanges and movable circumferentially over said cam surfaces to move the member outward radially to grip the inner surface of the rim, said rim having an inwardly-projecting stud and said gripping member having a bayonet slot for receiving said stud and locking the rim against axial movement in respect to the felly.

4. A vehicle wheel having a felly and a removable rim, a member carried by said felly and presenting a surface for engagement with a portion of the inner surface of the rim and having a recess therein, a stud carried by said rim for engaging within said recess and for locking the rim against circumferential movement, and a gripping member movable circumferentially to engage with another portion of the rim to grip the latter, said last-mentioned member having a bayonet slot therein and said rim having a second projection for engagement within said bayonet slot, to lock the rim against axial movement upon the circumferential movement of the gripping member.

5. A wheel having a felly, a removable rim, two gripping members movable circumferentially intermediate of said felly and rim and each having a cam surface for moving the same outward radially during the circumferential movement, a spreading member intermediate of said gripping members and having threaded engagement with each and provided with a worm wheel, and a worm in engagement with said worm wheel and rotatable about the axis parallel to the axis of the wheel for rotating said spreading member.

In testimony whereof I have signed my name to this specification in the presence of two subscribing witnesses.

WILLIAM L. HOWARD.

Witnesses:
CLAIR W. FAIRBANK,
JOHN P. DAVIS.